(12) United States Patent
Scholl et al.

(10) Patent No.: US 11,354,762 B2
(45) Date of Patent: Jun. 7, 2022

(54) DIGITAL PASSPORT SYSTEMS AND METHODS

(71) Applicant: MASTERCARD INTERNATIONAL INCORPORATED, Purchase, NY (US)

(72) Inventors: Christopher T. Scholl, Saint Peters, MO (US); Regan E. Harmon, O'Fallon, MO (US); William Raymond Bowie, Lake St. Louis, MO (US); Matthew Wease, St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 287 days.

(21) Appl. No.: 15/829,617

(22) Filed: Dec. 1, 2017

(65) Prior Publication Data

US 2019/0172167 A1 Jun. 6, 2019

(51) Int. Cl.
| | |
|---|---|
| *G06Q 50/00* | (2012.01) |
| *G06Q 50/26* | (2012.01) |
| *G06Q 30/00* | (2012.01) |
| *G06Q 20/36* | (2012.01) |
| *G06F 16/951* | (2019.01) |

(52) U.S. Cl.
CPC ........... *G06Q 50/26* (2013.01); *G06F 16/951* (2019.01); *G06Q 20/363* (2013.01); *G06Q 30/018* (2013.01)

(58) Field of Classification Search
CPC ........ G06Q 10/02; G06Q 20/04; G06Q 20/34; G06Q 20/35; G06Q 20/36; G06Q 20/045; G06Q 20/341; G06Q 20/355; G06Q 20/363; G06Q 20/3576; G06Q 30/01; G06Q 30/018; G06Q 50/26; G06F 16/951
USPC ................................................. 705/4, 35–45
See application file for complete search history.

(56) References Cited

U.S. PATENT DOCUMENTS

| | | | |
|---|---|---|---|
| 6,386,451 B1 | 5/2002 | Sehr | |
| 6,565,000 B2 | 5/2003 | Sehr | |
| 6,609,659 B2 | 8/2003 | Sehr | |
| 8,793,340 B2 | 7/2014 | Faure et al. | |
| 9,183,364 B2 | 11/2015 | Szoke et al. | |
| 9,544,154 B2 | 1/2017 | Proust et al. | |
| 2002/0100802 A1* | 8/2002 | Sehr ..................... | G06Q 20/045 235/384 |

(Continued)

*Primary Examiner* — Rajesh Khattar
*Assistant Examiner* — Mohammed H Mustafa
(74) *Attorney, Agent, or Firm* — Armstrong Teasdale LLP

(57) ABSTRACT

A wallet provider (WP) computing device is provided for extending a digital passport object stored in a digital wallet. The WP computing device includes a processor and a memory in communication with the processor. The processor is programmed to receive an augmentation request associated with the digital passport object from a requesting user device, retrieve an augmentation template and trusted authentication data based at least in part on the augmentation request, generate an augmentation package associated with the digital passport object, transmit an authentication request to an authenticating user device, receive an authentication response from the user device, determine an authentication evaluation of the augmentation package associated with the digital passport object, and transmit the updated augmentation package to the sponsoring authority.

18 Claims, 7 Drawing Sheets

(56) References Cited

U.S. PATENT DOCUMENTS

| | | | |
|---|---|---|---|
| 2002/0100803 A1* | 8/2002 | Sehr | G06Q 10/02 235/384 |
| 2003/0023858 A1* | 1/2003 | Banerjee | H04L 9/3263 713/189 |
| 2016/0328686 A1 | 11/2016 | Shimura et al. | |
| 2017/0193513 A1* | 7/2017 | Zand-Biglari | G06Q 20/4016 |

* cited by examiner

DIGITAL PASSPORT SYSTEMS AND METHODS

BACKGROUND

The field of the present disclosure relates generally to a digital passport system, and in particular, to the extension or renewal of digital passports within a digital wallet to provide additional or updated information.

At least some identity verification systems rely upon physical documents or other identity devices as trusted sources of identity data when authenticating a person. For example, a passport is a document for traveling internationally that includes identity data associated with a passport holder in addition to a log of different countries or locations visited by the passport holder. When traveling internationally, a verification agent requests the passport from the passport holder to perform an authentication process. The authentication process may include, for example, comparing a photo of the passport holder in the passport to the passport holder's face and comparing the name listed in the passport to a different document (e.g., a plane ticket). If the verification agent determines that the passport holder is authenticated, the agent marks the log in the passport to record the international trip and allows the passport holder to proceed with his or her travel.

The dependence upon physical passports, in at least some known passport systems, may lead to limitations in the ability to track and update issued passports. For example, issuing a physical passport or renewing the passport may require the prospective passport holder to manually complete an application form, mail the form to a sponsoring authority of the passport, and await the passport to arrive in the mail. These known systems may require repetitive and time-intensive user actions to copy information into application forms. This may induce errors, further extending processing time, generating incorrect data records, creating database errors, and increasing dissatisfaction. These errors may also impede the electronic processing of applications and/or may lead to inaccurate or 'orphaned' digital records, further delaying processing. Additionally, the processing time taken to issue or renew a passport and subsequently the time required to mail the passport may take several days or weeks. During those periods of time, the passport holder is unable to reliably travel internationally, thereby inconveniencing the passport holder.

The inability to obtain and/or renew a passport using digital technology can be very frustrating for many contemporary travelers. At least some aspects of travel can be performed using digital technology, such as checking in for a flight, paying for travel, and the like. For example, digital wallet systems include the ability to store payment card information digitally on a user device and perform payment transactions, such as travel-related transactions, without the corresponding physical payment card. In addition, travelers can download apps to their smartphones that enable them to check-in for flights. Travelers expect timely, yet secure, service to reduce the inconveniences incurred during travel.

In light of the foregoing, an enhanced system and method for extending or renewing passports is needed that resolves the inefficiencies and inconveniences of known passport extension systems.

BRIEF DESCRIPTION

In one aspect, a wallet provider (WP) computing device is provided for extending a digital passport object stored in a digital wallet. The WP computing device includes a processor and a memory in communication with the processor. The processor is programmed to receive an augmentation request associated with the digital passport object from a requesting user device, retrieve an augmentation template and trusted authentication data based at least in part on the augmentation request, generate an augmentation package associated with the digital passport object, transmit an authentication request to an authenticating user device, receive an authentication response from the user device, determine an authentication evaluation of the augmentation package associated with the digital passport object, and transmit the updated augmentation package to the sponsoring authority.

In another aspect, a computer-implemented method of extending digital passport objects stored in a digital wallet is provided. The method is implemented using a WP computing device including a processor in communication with a memory. The method includes receiving an augmentation request associated with the digital passport object from a requesting user device, retrieving an augmentation template and trusted authentication data based at least in part on the augmentation request, generating an augmentation package associated with the digital passport object, transmitting an authentication request to an authenticating user device, receiving an authentication response from the user device, determining an authentication evaluation of the augmentation package associated with the digital passport object, and transmitting the updated augmentation package to the sponsoring authority.

In yet another aspect, a non-transitory computer-readable storage medium having computer executable instructions embodied thereon is provided. When executed by a WP computing device including a processor in communication with a memory, the computer-executable instructions cause the WP computing device to receive an augmentation request associated with the digital passport object from a requesting user device, retrieve an augmentation template and trusted authentication data based at least in part on the augmentation request, generate an augmentation package associated with the digital passport object, transmit an authentication request to an authenticating user device, receive an authentication response from the user device, determine an authentication evaluation of the augmentation package associated with the digital passport object, and transmit the updated augmentation package to the sponsoring authority.

BRIEF DESCRIPTION OF THE DRAWINGS

FIG. 1 is a simplified block diagram of an example computer system used for managing digital passport objects in accordance with one embodiment of the present disclosure.

FIG. 2 is a message flow chart of an example implementation of the system shown in FIG. 1.

FIG. 3 is a message flow chart of an example implementation of the system shown in FIG. 1.

FIG. 4 illustrates an example configuration of a user computer device that may be used with the system shown in FIG. 1.

FIG. 5 illustrates an example configuration of a server computing device that may be used with the system shown in FIG. 1.

FIG. 6 is a flowchart illustrating an example process of extending digital passport objects by the system shown in FIG. 1.

FIG. 7 is a diagram of components of one or more example computing devices that may be used in embodiments of the described systems and methods.

DETAILED DESCRIPTION

Figure 1:
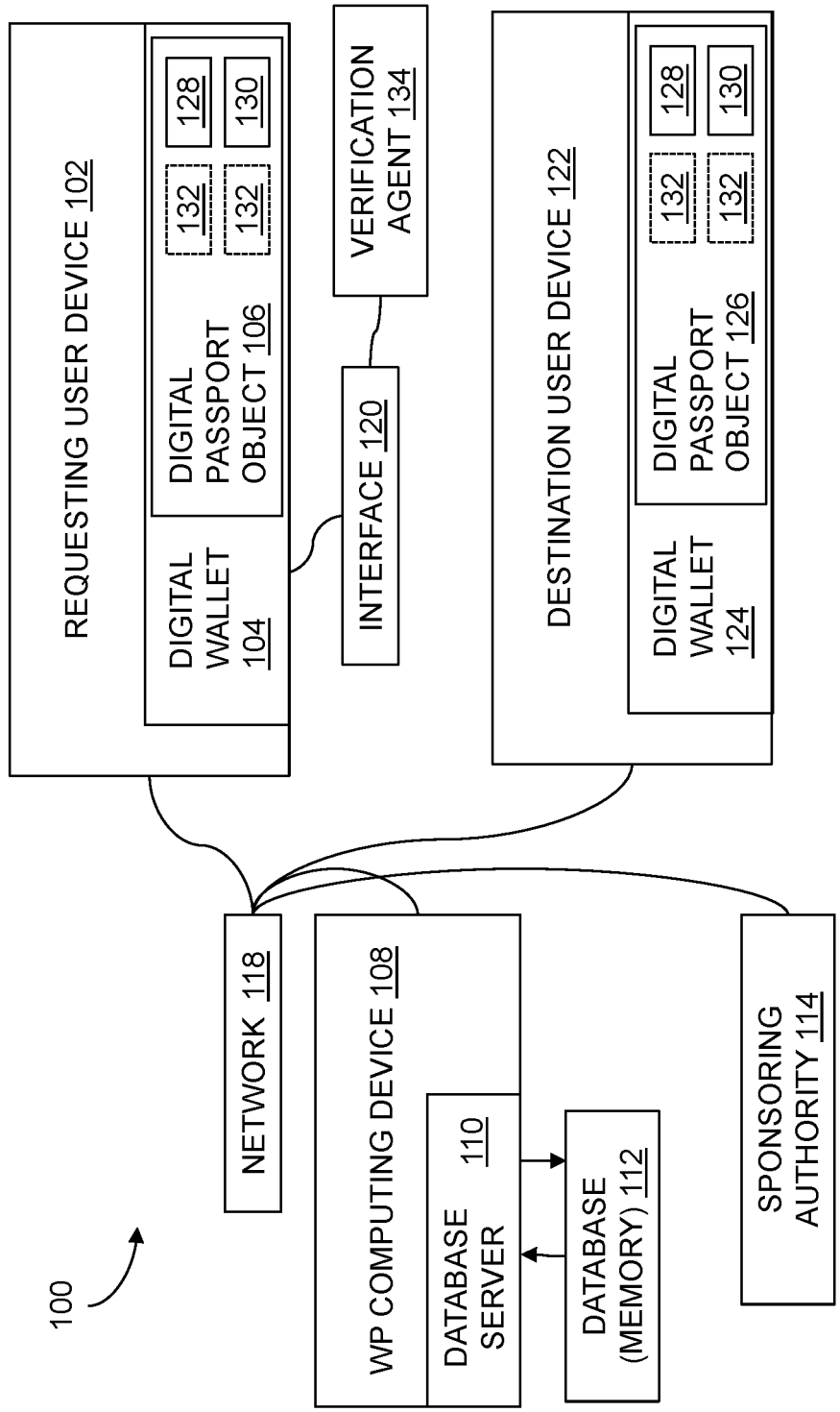
FIGS. 1-7 show example embodiments of the methods and systems described herein.

Embodiments of the present disclosure relate generally to a digital passport system for extending (e.g., renewing or issuing) digital passport objects. As used herein, the term "digital passport object" is used to refer to a digital representation of a passport associated with a passport holder. In some embodiments, the digital passport object is a predefined data structure associated with a physical passport document. Additionally or alternatively, the digital passport object is a representation of a sponsored identity document. A sponsored identity document may include, but is not limited to, a driver's license, lawful permanent resident card, work authorization card, visa, identification card, or professional license. The digital passport object is used during international travel and/or other authentication processes to verify the identity of the passport holder. In some embodiments, the digital passport object is generated (i.e., issued) by a government agency or an official state representative. In other embodiments, the digital passport object is issued and/or sponsored by a private entity. The digital passport object is associated with at least one digital passport object identifier.

In some embodiments, the digital passport object identifier is used in conjunction with a database to retrieve information associated with the digital passport object, or the digital passport object. In the example embodiment, as some of the information stored in the database may include personally identifiable information (PII), any stored PII is encrypted to prevent unauthorized access to the PII. Moreover, in any embodiments in which PII may be collected, the user from which the PII may be collected is provided an opportunity to agree to or deny collection of such data.

Within the context of this disclosure, a digital passport object is configured to include, at least, a header, addendum data, and metadata (e.g., creation date, expiration identifier). The header includes a digital passport object identifier (e.g., passport number, serial number), passport holder identifying information (e.g., name, birthplace, social security number), and sponsoring authority identifying information (e.g., government agency, official representative, issuer number). In some embodiments, the digital passport object includes addendum data. Additionally, the header and/or the metadata may specify the structure of the addendum data (i.e., what data is included within the addendum data and how the data is organized). The addendum data includes any number of data segments representing addendum data. In some embodiments, addendum data includes biometric information (e.g., iris scans, fingerprint data) associated with the passport holder. Additionally or alternatively, the addendum data contains biographic data (e.g., citizenship, birthplace, marriage status) associated with the passport holder. Addendum data may include passport endorsements associated with the digital passport object, including data provided by the sponsoring authority. For example, work authorizations, lawful permanent resident status information, visas, entrance stamps, exit permits, and the like may be included in addendum data as passport endorsements. In certain embodiments, addendum data includes history information associated with the digital passport object, including records of the transmission and/or encoding of the digital passport object. For example, addendum data may include a time and location when the digital passport object was transmitted and/or updated.

As used herein, the term "sponsoring authority" refers to an entity associated with the digital passport object. In one embodiment, the digital passport object is associated with one sponsoring authority. For example, the digital passport object may be sponsored by a passport office associated with a government or state. In other embodiments, the digital passport object is associated with multiple sponsoring authorities. In at least some embodiments, a sponsoring authority may issue a digital passport object, and an additional sponsoring authority may extend the digital passport object with an endorsement or authorization. For example, the digital passport object may be issued with the sponsorship of a state agency, and may subsequently be extended with a visa sponsored by another government entity. In some embodiments, the digital passport object is issued by the sponsoring authority. In one embodiment, the digital passport object is issued by a wallet provider. The wallet provider is an entity that manages digital wallets stored on user devices for facilitating payment card transactions. The digital wallet stores encrypted payment card information for use in transactions as a replacement for the physical payment cards. In one example, the wallet provider may be authorized to generate digital passport objects on behalf of a sponsoring authority. In some embodiments, the sponsoring authority may issue a passport (e.g., physical passport document), and the digital passport object is generated by a wallet provider.

As used herein, the term "extending" refers to updating, renewing, and/or appending data to a digital passport object, and, in at least some embodiments, is performed by the sponsoring authority. In some embodiments, an extending process may be initiated by a renewal request, associated with the digital passport object, to request that the expiration date of the digital passport object be renewed. In some embodiments, extending the digital passport may include providing an additional endorsement associated with the digital passport object such as a visa or work authorization. In another example, a transportation-related endorsement may be requested, such as security pre-check or registered traveler services. In some embodiments, the extension is associated with the sponsoring authority of the digital passport object. For example, a renewal extension may be associated with the sponsoring authority that issued the digital passport object. In other embodiments, the extension is associated with a different sponsoring authority. For example, a sponsoring authority may offer a visa extension for a passport issued by another sponsoring authority. In yet other embodiments, the extension is not associated with a sponsoring authority, and is processed by the wallet provider. For example, the wallet provider may offer a security pre-check extension.

The user device is configured to provide the digital passport object, including associated extensions, to a verification agent. In the example embodiment, the user device is configured to present the digital passport object and/or an identifier associated with the digital passport object during an authentication process (e.g., when traveling across international borders). In particular, the user device is configured to present the digital passport object and/or the associated identifier to a verification agent for authentication. A verification agent is an entity, person, and/or device associated with an authenticating party, such as a party that monitors traffic across territorial borders. In one example, the verification agent may scan a machine readable encoding of the passport provided by the user, or may interpret a human-readable encoding. The verification agent may use the digital passport object to assess the identity of the associated passport holder against entry requirements for the borders. The verification agent determines whether or not the user presenting the digital passport is the actual user associated with the digital passport object and/or which (if any) permissions to grant to the user (e.g., work permission). In one example, information encoded in the digital passport object may be compared with a database, or biometric information may be captured and compared with trusted or verified authentication information stored within the digital passport object.

In one embodiment, the verification agent may scan a machine readable encoding of the digital passport object. For example, the verification agent may scan a QR code displayed on a user device, wherein the QR code is an encoding of the digital passport object. In an alternative embodiment, the verification agent may interpret a human readable encoding of the digital passport object. In yet another embodiment, the verification agent may receive a digital transmission including the digital passport object. For example, the verification agent may receive the encoding of the digital passport object over Bluetooth.

In some embodiments, a digital wallet is configured to detect a verification agent. For example, a user device associated with a digital wallet may be connected to a network (e.g., Wi-Fi, cellular network) associated with a verification agent, and the digital wallet may automatically digitally transmit an encoding of the digital passport object. As another example, the user device associated with a digital wallet may detect a geographic location (e.g., airport, border, inspection station) associated with a verification agent and automatically display a machine readable encoding of the digital passport object.

As used herein, the term "user device" refers to a computing device including a digital wallet, and is associated with a wallet holder (i.e., device user). The user device may include, but is not limited to, a smart phone, a tablet, a laptop, a smart watch, and the like. In some embodiments, the user device is connected to a network associated with a wallet provider (WP) computing device to facilitate bidirectional communication.

As used herein, the term "digital wallet" refers to an application (e.g., an app) and associated wallet information, stored on a user device, and provided by a digital wallet provider. Wallet information includes, but is not limited to, payment card information (e.g., payment card number), payment account information (e.g., bank account number), and identity information (e.g., name, address, phone number, social security number). Additionally, the digital wallet is associated with a wallet holder. In at least some embodiments, the wallet holder is the passport holder. In other embodiments, the wallet holder is only associated with the passport holder. For example, the wallet holder may be a parent of the passport holder.

In some embodiments, the digital wallet is configured to store authentication information related to the digital wallet and/or wallet holder. For example, the digital wallet may store biometric information (e.g., fingerprint), or a password. Additionally or alternatively, the digital wallet is further configured to process authentication challenges associated with information stored in the digital wallet. For example, the digital wallet may present an authentication challenge including requesting a fingerprint scan, and comparing it to stored biometric information.

The WP computing device is communicatively coupled with a network, including at least one user device. In some embodiments, the WP computing device is an integral component of the network. In other embodiments, the WP computing device is in communication with a network (e.g. local area network, wide area network). For example, the WP computing device may use a network associated with the WP computing device to transmit the digital passport object to a user device communicatively coupled to the network. In some embodiments, the WP computing device is communicatively coupled to a payment network that processes payment card transactions.

The WP computing device may be associated with a "wallet provider" that manages a number of digital wallets. In some embodiments, the digital wallet information is stored on both the user device and the WP computing device. Additionally or alternatively, the WP computing device may store an index or abbreviated version of the wallet information stored on the user device. In other embodiments, the digital wallet information is stored on the user device, such that the WP computing device requests the digital wallet information from the user device. In one example, the WP computing device computing device stores an index of the digital wallet information and retrieves the digital wallet information from the user device based upon the index.

The WP computing device is configured to extend (e.g., renew, endorse) the digital passport object in response to receiving an augmentation request associated with the digital passport object from a requesting user device. The augmentation request includes the digital passport object identifier. Additionally or alternatively, the augmentation request may include the digital passport object. In some embodiments, the augmentation request is caused by user action. For example, a user may request a digital passport object be renewed. In one embodiment, the augmentation request is in response to a notification on a user device. For example, a notification may be displayed based on an expiration identifier included in the digital passport object.

In some embodiments, the WP computing device is configured to provide a notification of an available augmentation/extension to a user device, based on information stored in a digital wallet associated with the user device. In one embodiment, the WP computing device is configured to detect payment transactions associated with a digital wallet, wherein said payment transactions includes addendum data indicating international travel, and may transmit a notification indicating a digital passport object also associated with the digital wallet is expired. For example, a user may purchase an international flight ticket using payment information stored in a digital wallet, and the WP computing device may transmit a notification to a device associated with the digital wallet, indicating the digital passport object has expired, and cannot be used for international travel.

The WP computing device is configured to retrieve an augmentation template associated with a sponsoring authority, based at least in part on the augmentation request. For example, the WP computing device may determine a sponsoring authority associated with the digital passport object identifier. In one embodiment, the WP computing device is configured to communicate over a network with the sponsoring authority to retrieve an augmentation template. For example, an API (Application Programming Interface) call may be made to a sponsoring authority computing device. In another embodiment, the WP computing device is configured to retrieve a stored augmentation template associated with a sponsoring authority. For example, the WP computing device may retrieve an augmentation template representing a renewal application for a passport, wherein the augmentation template is retrieved from the sponsoring authority associated with the passport. As another example, the WP computing device may retrieve an augmentation template representing a visa application for a passport identified in an augmentation request, wherein the augmentation is retrieved from the sponsoring authority identified in the augmentation request.

The augmentation template includes at least one specification of a data parameter. In one embodiment, the augmentation template specifies information (e.g., digital passport object identifier, social security number, phone number) to be included in an augmentation package. In other embodiments, the augmentation template specifies categories of information to be included in an augmentation package. For example, the augmentation template may specify that residency information or citizenship information is to be included in an augmentation package, and the WP computing device may be configured to determine what constitutes residency and citizenship information.

The WP computing device is configured to generate an augmentation package associated with the digital passport object, based at least in part on the augmentation template. In one embodiment, the WP computing device is configured to retrieve information associated with a digital wallet, and encode the retrieved information into an augmentation package configured to satisfy the specifications represented in the augmentation template.

In some embodiments, the WP computing device is further configured to provide instructions for the sponsoring authority to generate and provide a physical passport, wherein the physical passport is extended similarly to the digital passport object. For example, an augmentation package may include a request for a renewed physical passport, associated with a request for a renewed digital passport object, and additionally may include a mailing address associated with the passport holder.

In some embodiments, the WP computing device is configured to include payment information in the augmentation package. In one example embodiment, the WP computing device includes an indicator that the WP computing device has processed a digital wallet payment transaction associated with an application fee included in an augmentation template. In another example embodiment, the WP computing device is configured to include digital wallet payment information (e.g., account number, payment card number) in the augmentation package.

In some embodiments, the WP computing device is configured to compare the augmentation template with data available from a digital wallet, and further generate a request for user data.

In such embodiments, the WP computing device is configured to query a wallet profile associated with a digital wallet, based at least in part on an augmentation template, wherein the query is configured to retrieve user data. For example, the query may include a data parameter specified in the augmentation template, such as a social security number or digital passport object identifier. In one embodiment, the WP computing device is configured to query a user device associated with a digital wallet. In another embodiment, the WP computing device is configured to query a database associated with the WP computing device, wherein said database stores wallet profiles.

Further in such embodiments, the WP computing device is configured to identify user data missing from the digital wallet, based at least in part on the augmentation template. In one embodiment, the WP computing device may compare the retrieved user data to the augmentation template. For example, the augmentation template may represent a request for a social security number, and a permanent address. The WP computing device may identify a match for the social security number request with retrieved user data, but may identify no match for the permanent address request. In some embodiments, the WP computing device may identify partial matches between augmentation templates and retrieved user data.

In response to identifying user data missing from the digital wallet, the WP computing device is configured to generate a user data request, based at least in part on the missing user data, wherein the user data request includes at least one data parameter. For example, if no phone number is identified as specified by the augmentation template, the user data request may include a request for a phone number.

The WP computing device is configured to transmit the user data request to the user device, using a network associated with the WP computing device. For example, the WP computing device may send a push notification to a user device, or transmit the user data request over a WebSocket connection to a user device. In some embodiments, the WP computing device provides a user device application for responding to user data requests. For example, the user data request may include instructions for displaying an interface on the user device, allowing the wallet holder to input data in response to the user data request.

The WP computing device is configured to receive a user data response from a user device over a network associated with the WP computing device, wherein the user data response is based at least in part on the user data request. In one embodiment, the user data response includes data provided by a wallet holder. For example, a wallet holder may enter a mailing address in response to a user data request indicating mailing address information was not matched (i.e., missing). In another embodiment, the user data response may include data supplied by the digital wallet associated with the user device. For example, a user may manually match data from the digital wallet against data identified as missing in the user data request. In some embodiments, The WP computing device is configured to receive the user data response in a similar format to which associated user data request was transmitted.

In response to receiving a user data response including the requested user data, the WP computing device is configured to apply the requested user data to the augmentation package. In one embodiment, the user data in the user data response is appended to the augmentation package. For example, an additional address or phone number may be included in the user data response, and may further be added to the augmentation package. In another embodiment, the user data in the user response may overwrite data in the augmentation package. For example, a corrected phone number may be included in the user data response, and replace a phone number in the augmentation package.

The WP computing device is configured to retrieve trusted authentication data, based at least in part on the augmentation request. In one embodiment, the trusted authentication data is retrieved based on a wallet holder associated with the augmentation request. In another embodiment, the trusted authentication data is retrieved based on a party identified in the augmentation request. As used herein, authentication data may include a password, passcode, private key, fingerprint data, other biometric data, and the like. Additionally or alternatively, the authentication data may include hashes or encoded forms of the aforementioned authentication data. In one example embodiment, the WP computing device may query wallet profiles to retrieve trusted authentication data based on the digital passport object identifier or a social security number, wherein the wallet profile is stored within a database associated with the WP computing device or on an associated user device.

The WP computing device is configured to transmit an authentication request to an authenticating user device, wherein the authenticating request is based on trusted authentication data. The authentication request includes at least one authentication challenge, such as a request for a password, a security question, a biometric request, and the like. In some embodiments, the authentication request includes instructions for processing the authentication challenge(s). The authenticating user device is determined based on the augmentation request, and/or the trusted authentication data. For example, a user device may be specified in the trusted user data. As another example, a user device may be specified in the augmentation request. In some embodiments, the requesting user device is the authenticating user device. The WP computing device is configured to transmit an authentication request using a network associated with the WP computing device.

The WP computing device is configured to receive an authentication response from the authenticating user device, wherein the authentication response includes at least one authentication factor. As used herein, authentication factor represents, at least in part, a response to an authentication challenge included in an authentication request. For example, an authentication response may include a password in response to an authentication request including a password based authentication challenge. The WP computing device may receive an authentication response using a network associated with the WP computing device.

The WP computing device is configured to determine an authentication evaluation of the augmentation package associated with the digital passport object, based at least in part on the at least one authentication factor. The WP computing device is further configured to determine the authentication evaluation based at least in part on the trusted user data. In one embodiment, the determination includes comparing an authentication factor included in an authentication response to the retrieved trusted user data. For example, a password received in the authentication response may be compared to a hashed password included in the trusted user data. Additionally or alternatively, the data associated with the augmentation package is compared to the trusted user data. For example, user provided data in the augmentation package may be compared with a wallet profile stored in a database associated with the WP computing device, wherein the WP computing device is configured to identify fraudulent or incorrect data in the augmentation package. As a specific example, the WP computing device may identify that a mailing address provided in an augmentation package is not associated with the wallet holder, and may lower the authentication evaluation in response thereto.

In one embodiment, the authentication evaluation includes a score. For example, the score may represent the wallet provider's confidence in the accuracy of the augmentation package. In another embodiment, the authentication evaluation includes an indicator. For example, the indicator may confirm the wallet provider has authenticated the augmentation package with the wallet holder. Additionally or alternatively, the indicator may confirm the wallet provider has confirmed the information associated with the augmentation package with data stored by (or accessible to) the wallet provider. In some embodiments, the authentication evaluation may include a digital (i.e., cryptographic) signature of the augmentation package. In some embodiments, the authentication evaluation is appended to the augmentation package. Additionally or alternatively, the augmentation evaluation is associated with the augmentation package.

The WP computing device is configured to transmit an augmentation package, based at least in part on an augmentation template, to the sponsoring authority associated with the augmentation template.

The WP computing device is configured to receive an augmentation response from a sponsoring authority, wherein the augmentation response is associated with an augmentation package. In one embodiment, the augmentation response includes a digital passport object. For example, the augmentation response may include an extended (e.g., renewed, endorsed) digital passport object. In another embodiment, the augmentation response may include an indicator (e.g., digital signature) that the augmentation package has been approved by the sponsoring authority, and the WP computing device may generate an augmented digital passport object as indicated by the augmentation response. For example, the WP computing device may generate digital passports on behalf of a sponsoring authority.

In some embodiments, the WP computing device is configured to encode an augmented digital passport object, wherein encodings (i.e., representations) include a machine-readable encoding, a human-readable encoding, a digital transmission, and the like. In one embodiment, the digital passport object is processed into a machine readable encoding (e.g., barcode, QR code, OCR optimized text). In another embodiment, the digital passport object is processed into a human readable encoding (e.g., formatted text, graphic, table). In yet another embodiment, the digital passport object is processed into a digital transmission (e.g., TCP/UDP packet, radio transmission, NFC transmission, Bluetooth transmission). In some embodiments, the entire digital passport object (e.g., metadata, header, and addendum data) is encoded. In other embodiments, a subset of the digital passport object is encoded (e.g., only header data). In yet another embodiment, only an identifier (e.g., passport number) of the digital passport object is encoded. In some embodiments, the WP computing device is configured to transmit an extended digital passport object, associated with an augmentation response, to the requesting user device. In some embodiments, the extended digital passport object includes instructions for storing the digital passport object in a digital wallet associated with the requesting user device. For example, the instructions may include encrypting the digital passport object, or storing it within a secure enclave component of the user device. Additionally or alternatively, the WP computing device may transmit one or more encodings of the extended digital passport object to the requesting user device. For example, the WP computing device may transmit an extended digital passport object to the requesting user device, wherein the extended digital passport object is encoded as a QR code.

In some embodiments, a digital passport object, or an associated encoding, stored in a digital wallet is provided through an interface to a verification agent. For example, the verification agent may optically scan a machine readable encoding of the passport. In another example, the verification agent may interpret a human readable encoding of the digital passport object. In yet another example, the verification agent may receive a digital transmission including the digital passport object, through Bluetooth, RF, NFC, Wi-Fi, and the like.

Aspects of the present disclosure include methods for securely transmitting digital passport objects from source (i.e., requesting) user devices, to destination devices. This has the advantage of allowing one device to contain accurate information on a number of digital passport objects, while simultaneously allowing for copies of digital passport objects to be securely generated and tracked. For example, both the source user device and the destination user device may be authenticated/verified using the methods described herein.

In one example embodiment, a passport holder associated with a digital wallet containing the digital passport object may request transmission of the digital passport object to a destination user device associated with a business colleague. The passport holder may specify a phone number associated with the colleague, and duration for the transmitted digital passport object to be valid. The passport holder may authenticate the transmission using a password and fingerprint. The colleague may authenticate the destination user device using a pin code, password, and the like. In some embodiments, a secondary digital passport object associated is transmitted to and stored by the destination device in response to the transmission request. In one example, after the specified duration has elapsed, the secondary digital passport object may become inactive or be deleted by the destination device.

In another example embodiment, a passport holder associated with a digital wallet containing the digital passport object may request transmission of the digital passport object to a destination device associated with a family member so the family member (e.g., parent or guardian) can be the keeper of the passports. The family member associated with the destination device may authenticate the transfer using information stored in a digital wallet confirming their family relationship with the passport holder. A secondary passport object may then be transmitted to and stored by the destination device, and may accessible until the digital passport object expires, or is recalled by the passport holder.

As used herein, the term "source user device" refers to a device storing a digital wallet, and associated wallet holder, wherein the digital wallet includes the digital passport object associated with a passport holder. The passport holder may or may not be the wallet holder.

As used herein, the term "destination device" refers to a device capable of storing a digital wallet, and associated with a device user. In some embodiments, the destination device stores a digital wallet. In other embodiments, the WP computing device is configured to provide instructions to the destination device to create a digital wallet associated with the device user.

The destination device is communicatively coupled with the source user device, providing for the transmission of data between devices. In one embodiment, the destination device and source user device are both attached to a common network, including a Wi-Fi network, cellular network, wide area network, and the like. In another embodiment, the destination device and source user device form an 'ad-hoc' connection between the devices, including, Bluetooth, Near-Field Communication, optical communication, and the like. In one embodiment, the communication is provided by a digital wallet provider.

As used herein, the term "secondary digital passport object" refers to a digital passport object generated by the WP computing device, wherein the secondary digital passport object is associated with the digital passport object (i.e., primary digital passport object). The primary digital passport object includes a first expiration identifier. Similarly, the secondary digital passport object includes a second expiration identifier. In one embodiment, the second expiration identifier is the same as the first expiration identifier. In another embodiment, the second expiration identifier may indicate expiration before the first digital passport object. The second expiration identifier may or may not replace the first expiration identifier. For example, the second expiration identifier may be included in the secondary digital passport object along with the first expiration identifier.

As used herein, the term "expiration identifier" indicates a time when an associated digital passport object is no longer valid. In one embodiment, the expiration identifier includes a date when the digital passport object is no longer valid. In another embodiment, the expiration identifier includes duration of time for which the digital passport object is to be valid. In some embodiments, the expiration identifier is specified by a sponsoring authority. Additionally or alternatively, the expiration identifier is specified by wallet provider and/or passport holder.

In some embodiments, the WP computing device is configured to receive a transmission request from a source device, wherein the source device includes a digital wallet storing a primary digital passport object having a first expiration identifier associated with the primary digital passport object. The expiration identifier may include an expiration identifier, an expiration year, a duration of validity, and the like. The transmission request may further include a destination device identifier. For example, the destination device identifier may include a phone number of the destination device, or an identifier of a user associated with the destination device.

The WP computing device is configured to generate a secondary digital passport object having a second expiration, wherein the secondary digital passport object expires before the primary digital passport object. The generation of a secondary digital passport object is based at least in part on a transmission request. For example, the secondary digital passport object may be an augmentation of the primary digital passport object associated with the transmission request, wherein the secondary digital passport object has a second expiration specified in the transmission request. Additionally or alternatively, the secondary expiration is determined by the WP computing device or an augmentation template.

In some embodiments, the second expiration is determined based at least in part on the transmission request. For example, a user may specify a duration for which the secondary digital passport object is to be valid. Additionally or alternatively, the WP computing device may determine the secondary expiration based at least in part on the primary digital passport object. For example, the WP computing device may determine the second expiration is six months less than the first expiration associated with the primary digital passport object. In some embodiments, the WP computing device is configured to retrieve a second expiration from the sponsoring authority associated with the primary digital passport object.

In some embodiments, the WP computing device is configured to provide an alert associated with the generation of a secondary digital passport object, and based at least in part on the primary digital passport object. The alert may include the second expiration specified in the secondary digital passport object. In one embodiment, the alert is provided to the sponsoring authority identified as being associated with the primary digital passport object. Additionally or alternatively, the alert is provided to a wallet holder associated with the primary digital passport object.

In some embodiments, The WP computing device is configured to generate an authentication challenge, based at least in part on the transmission request, wherein generating the authentication challenge may include retrieving trusted user data. In one embodiment, the authentication challenge is based on the destination device identified in the transmission request. For example, trusted user data (e.g., password, biometric data) may be retrieved based upon a phone number, or other identifier, associated with the destination device. In another embodiment, the authentication challenge is based on the wallet holder associated with the primary digital passport object. For example, trusted user data may be retrieved based on the passport holder, using the digital passport object identifier.

In some embodiments, The WP computing device is configured to transmit an authentication challenge to a destination device. For example, a transmission request may be verified by challenging a user associated with the source device to enter a password. Additionally or alternatively, the WP computing device is configured to transmit an authentication challenge to a source user device. For example, the transmission request may be verified by challenging a user associated with the destination device to provide a fingerprint (i.e., biometric authentication). The WP computing device may transmit an authentication challenge using a network associated with the WP computing device.

In some embodiments, The WP computing device is configured to receive an authentication response, associated with an authentication challenge. In certain embodiments, the authentication response is received from the source user device and/or the destination device. The authentication response includes at least one authentication factor, representing a response to an authentication challenge. For example, the authentication response may include a password, pin number, one time password, or biometric (e.g., fingerprint) data. The WP computing device may receive an authentication response using a network associated with the WP computing device.

In some embodiments, The WP computing device is configured to transmit a secondary digital passport object to a destination user device when a received authentication response indicates the transmission request has been authenticated. For example, an authentication response may include data associated with an authentication challenge, wherein said data matches trusted user data. Additionally or alternatively, The WP computing device is further configured to transmit instructions causing the destination device to store the secondary digital passport object in a digital wallet associated with the destination device. The WP computing device may transmit a secondary digital passport object using a network associated with the WP computing device.

In certain embodiments, the WP computing device is configured to query a digital wallet to retrieve at least one payment card transaction, wherein the at least one payment card transaction includes a geographic region identifier and a travel date. For example, the WP computing device may query a payment network processing payment card transactions. Additionally or alternatively, the WP computing device may receive payment card transactions associated with payment cards stored in the digital wallet. The geographic region identifier includes a country code, airport code, station code, and the like. For example, the geographic region identifier may include "en-us", "uk", "LAX", and the like. Travel date may include the payment card transaction date, a date associated with reserved travel, a transaction posting date, and the like. The WP computing device is further configured to compare the travel date to an expiration date included in the digital passport object. For example, the WP computing device may determine the payment card transaction includes a date beyond the expiration date of the digital passport object, indicating the passport may need to be renewed. The WP computing device is further configured transmit an alert to the requesting user device, wherein the alert includes the travel date, the geographic region identifier, and the expiration date. In other words, the WP computing device is configured to alert a passport holder of planned (e.g., purchased) travel that requires a passport renewal.

In certain embodiments the WP computing device is configured to generate region-specific digital passport object encodings. For example, certain countries may define a passport barcode format. In one embodiment, the WP computing device is configured to receive a location identifier from requesting user computing device and determine the location identifier is associated with a transport hub having a region identifier, such as an airport or train station. The WP computing device is further configured to generate a machine readable encoding of the digital passport object based on the region identifier. For example, the WP computing device may generate a region-specific barcode or QR code based on the region identifier. Finally, the WP computing device is configured to transmit the machine readable encoding to the requesting user computing device.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transaction card can be used as a method of payment for performing a transaction. In addition, cardholder account behavior can include but is not limited to purchases, management activities (e.g. balance checking), bill payments, achievement of targets (meeting account balance goals, paying bills on time), and/or product registrations (e.g. mobile application downloads).

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The methods and systems described herein may be implemented using computer programming or engineering techniques including computer software, firmware, hardware or any combination or subset thereof, wherein the technical effects may be achieved by performing one of the following steps: (i) retrieve an augmentation template associated with a sponsoring authority, and trusted authentication data associated with a digital wallet, based at least in part on the augmentation request, (ii) generate an augmentation package associated with the digital passport object based at least in part on the augmentation template, (iii) transmit an authentication request to an authenticating user device, wherein the authentication request is based on the trusted authentication data, and (iv) receive an authentication response from the authenticating user device, wherein the authentication response includes at least one authentication factor; (v) determine an authentication evaluation of the augmentation package associated with the digital passport object, based at least in part on the at least one authentication factor and the trusted authentication data, wherein the authentication evaluation is appended to the augmentation package to create an updated augmentation package; and (vi) transmit the updated augmentation package to the sponsoring authority, wherein the sponsoring authority determines whether to extend the digital passport object based on the updated augmentation package.

The systems and methods described herein are configured to facilitate (a) reducing errors and processing time associated with lost and/or stolen digital passport objects, (b) detecting identity fraud with fraudulent passport extension requests (e.g., renewals), (c) reducing processing time in generating digital passport objects, (d) reducing errors associated with expired and/or outdated digital passport objects, and (e) detecting identity fraud with fraudulent duplication of digital passport objects.

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

FIG. 1 is an example diagram of a passport management system 100. In the example embodiment, system 100 includes a requesting user device 102, digital wallet 104, digital passport object 106 and WP computing device 108.

WP computing device 108 includes at least one database (i.e., memory) 112 associated with a database server 110. Although WP computing device 108 is shown as a single computing device, WP computing device 108 may be a plurality of computing devices communicatively coupled together that operate together to perform the functions described herein (i.e., a distributed computing system). WP computing device 108 is configured to be connected to network 118, and capable of bidirectional communication with other computing devices attached to network 118.

Requesting user device 102 is connected to network 118. Requesting user device 102 stores/includes digital wallet 104, wherein digital wallet 104 further includes at least one digital passport object 106. Requesting user device 102 is capable of communicating with verification agent 134 through interface 120.

Digital passport object 106 includes, at least, metadata 128 and header 130. Digital passport object 106 includes any number of addendum data segments 132.

Destination user device 122 is connected to network 118 and may further be in communication with requesting user device 102 and/or WP computing device 108. Destination user device 122 includes digital wallet 124 and digital passport object 126.

A sponsoring authority 114 is connected to network 118 through the use of any number of computing devices.

Figure 2:
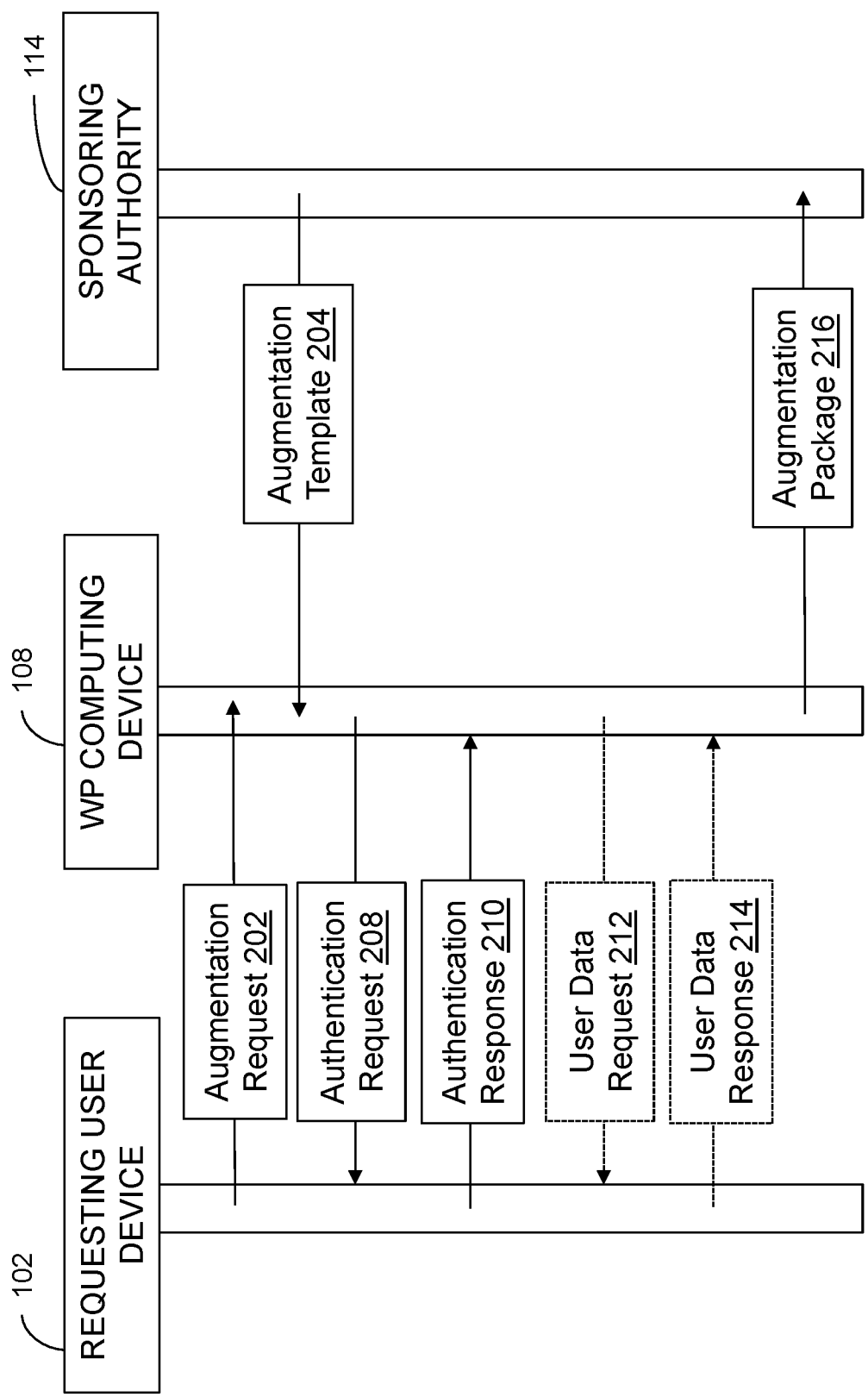

FIG. 2 is an example data flow diagram of system 100 (shown in FIG. 1) over network 118 (shown in FIG. 1), including requesting user device 102, WP computing device 108, and sponsoring authority device 114 during the process of extending a digital passport object. In other embodiments, additional, fewer, or alternative data is generated and/or transmitted within network 118 and passport management system 100 to facilitate the functionality described herein.

WP computing device 108 is configured to receive an augmentation request 202 from a requesting user device 102. In one embodiment, WP computing device 108 receives a request to renew a passport (e.g., an augmentation request), where the passport is stored as a digital passport object on requesting user device 102. For example, a user may initiate a renewal from an application included on requesting user device 102, such as a digital wallet application. In response to an augmentation request 202, WP computing device 108 is configured to retrieve an augmentation template 204 from sponsoring authority 114. In one embodiment, WP computing device 108 retrieves a specific passport renewal template based on the digital passport object and augmentation request 202. For example, WP computing device 108 may retrieve an adult passport renewal template where the digital passport object indicates the user is an adult.

Based at least in part on trusted user data retrieved by WP computing device 108, WP computing device 108 is configured to transmit an authentication request 208 to requesting user device 102. In other words, the WP computing device detects identity fraud by generating authentication request 208. In one embodiment, authentication request 208 includes a request for fingerprint biometric data. WP computing device 108 is further configured to receive an authentication response 210 from requesting user device 102. WP computing device 108 evaluates authentication response 210 by comparing it to stored trusted user data. For example, where authentication response 210 includes fingerprint biometric data, WP computing device 108 may compare received fingerprint biometric data with a trusted fingerprint biometric data.

In some embodiments, WP computing device 108 is configured to transmit a user data request 212 to requesting user device 102, and to receive a user data response 214 from requesting user device 102. In other words, WP computing device 108 may determine, based on augmentation template 204, that additional user data is required to process augmentation request 202. For example, WP computing device 108 may request the occupation of the user, based on augmentation template 204. After generating an augmentation package, WP computing device 108 is configured to transmit augmentation package 216 to sponsoring authority 114. In one embodiment, WP computing device 108 may transmit a finalized passport renewal request (e.g., augmentation package 216) to a sponsoring authority, such as a passport office.

Figure 3:
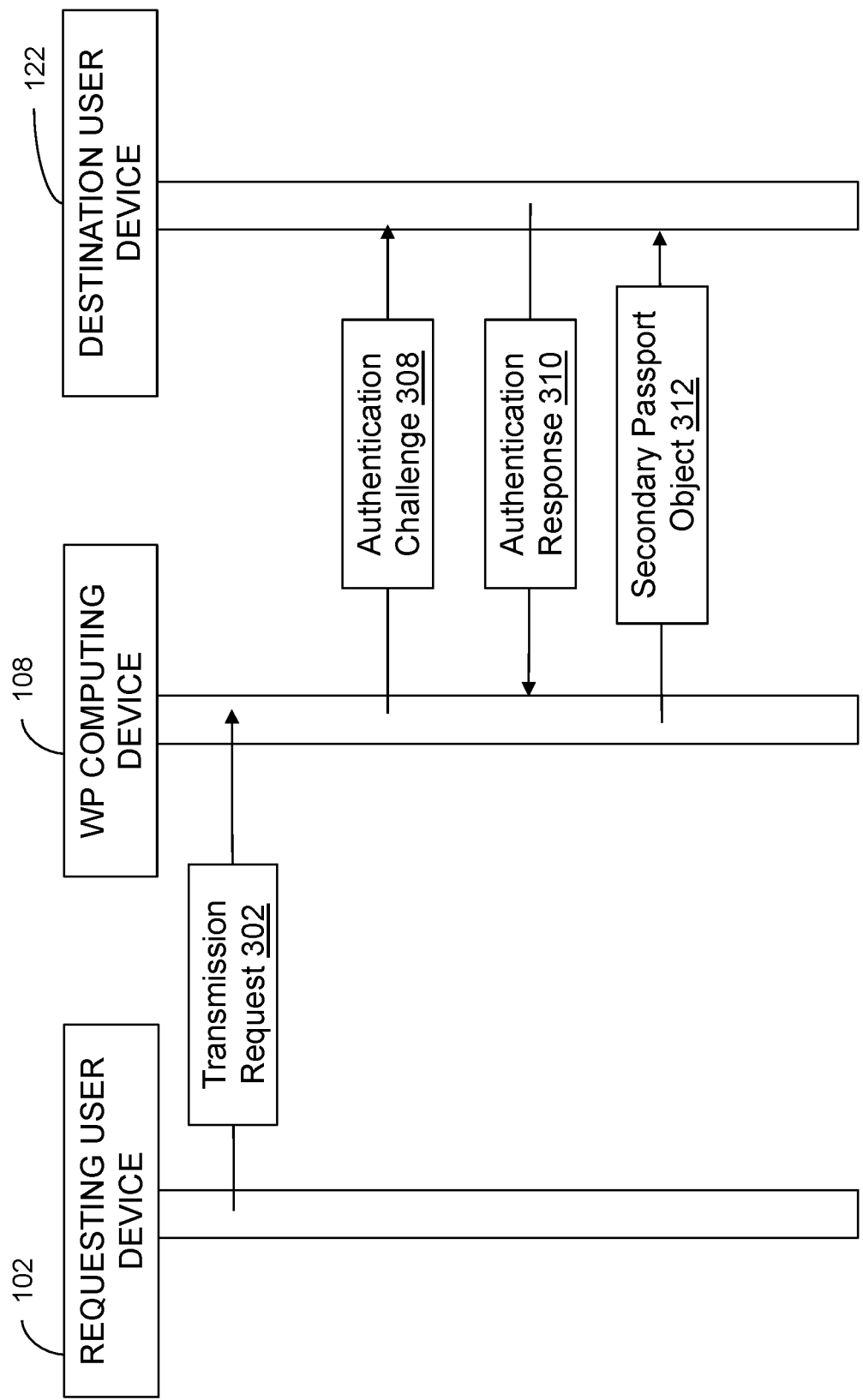

FIG. 3 is an example data flow diagram of system 100 (shown in FIG. 1) over network 118 (shown in FIG. 1), including requesting user device 102, WP computing device 108, and sponsoring authority 114 during the process of generating and transmitting a secondary digital passport object. In other words, FIG. 3 illustrates a process for securely generating a secondary digital passport object, such as a backup copy or a reference copy for a family member arranging travel. In other embodiments, additional, fewer, or alternative data may be generated and/or transmitted within network 118 and passport management system 100 to facilitate the functionality described herein.

In some embodiments, WP computing device 108 is configured to be in communication with a requesting user device 102 and a destination user device 122. In one embodiment, requesting user device 102 is associated with a business traveler, and destination user device 122 is associated with a travel arranger. In another embodiment, requesting user device 102 is associated with a child, and destination user device 122 is associated with a parent. In the example embodiment, WP computing device 108 receives a transmission request 302 from source (e.g., requesting) user device 102. For example, a business traveler may request the digital passport be shared with a travel arranger using a digital wallet application included on source (e.g., requesting) user device 102. In response to retrieving trusted user data, based at least in part on a transmission request 302, WP computing device 108 is configured to transmit an authentication challenge 308 to destination user device 122. In other words, WP computing device 108 is configured to detect identity fraud by verifying the user associated with destination user device 122 using authentication challenge 308. For example, WP computing device 108 may require a passcode be entered at destination user device 122. WP computing device 108 is further configured to receive an authentication response 310 from destination user device 122. After generating a secondary passport object 312, the WP computing device 108 is configured to transmit the secondary passport object 312 to destination user device 122. For example, a secondary passport may be generated and transmitted to a travel arranger associated with destination user device 122.

Figure 4:
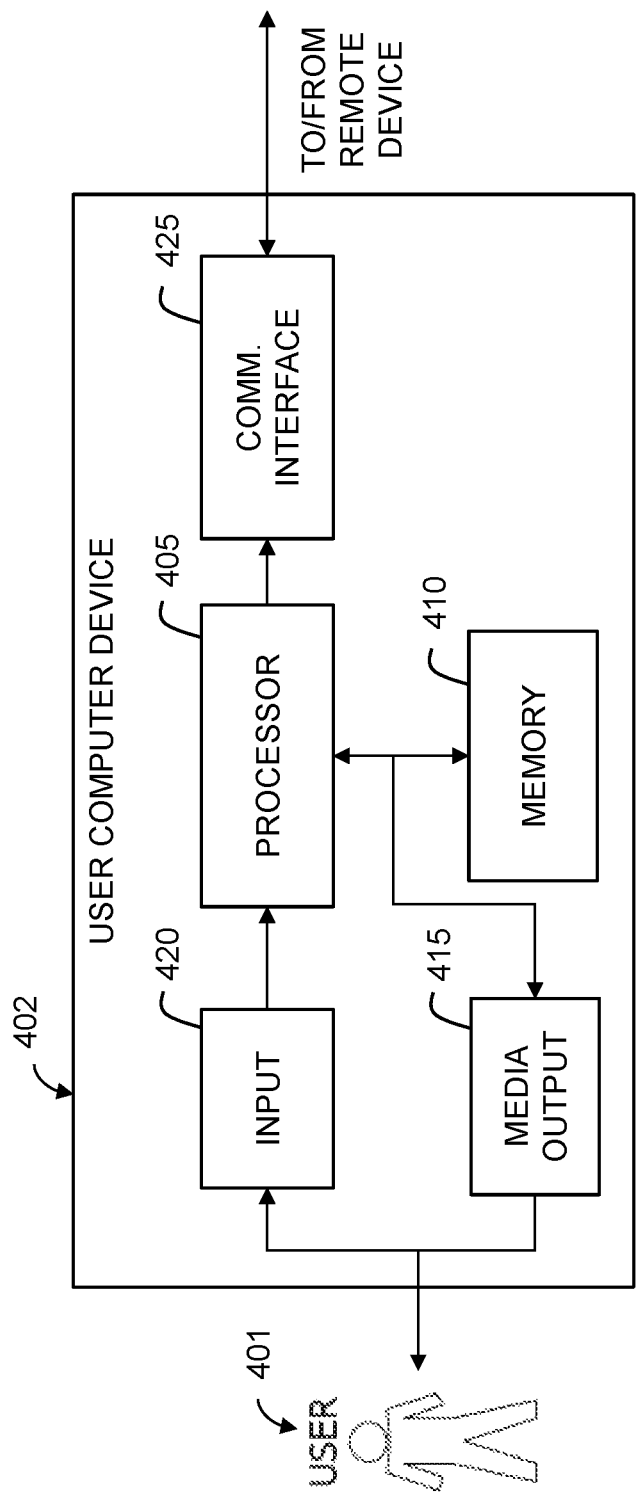

FIG. 4 depicts an exemplary configuration of a remote or user computing device 402, such as requesting user device 102 or destination user device 122 (shown in FIG. 1). Computing device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or other data to be stored and retrieved. Memory area 410 may include one or more computer-readable media.

Computing device 402 may also include at least one media output component 415 for presenting information to a user 401. Media output component 415 may be any component capable of conveying information to user 401. In some embodiments, media output component 415 may include an output adapter, such as a video adapter and/or an audio adapter. An output adapter may be operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 415 may be configured to present an interactive user interface (e.g., a web browser or client application) to user 401.

In some embodiments, computing device 402 may include an input device 420 for receiving input from user 401. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Computing device 402 may also include a communication interface 425, which may be communicatively coupleable to a remote device. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 420. A user interface may include, among other possibilities, a web browser and client application. Web browsers enable users 401 to display and interact with media and other information typically embedded on a web page or a website from a web server. A client application allows users 401 to interact with a server application associated with, for example, a vendor or business.

Figure 5:
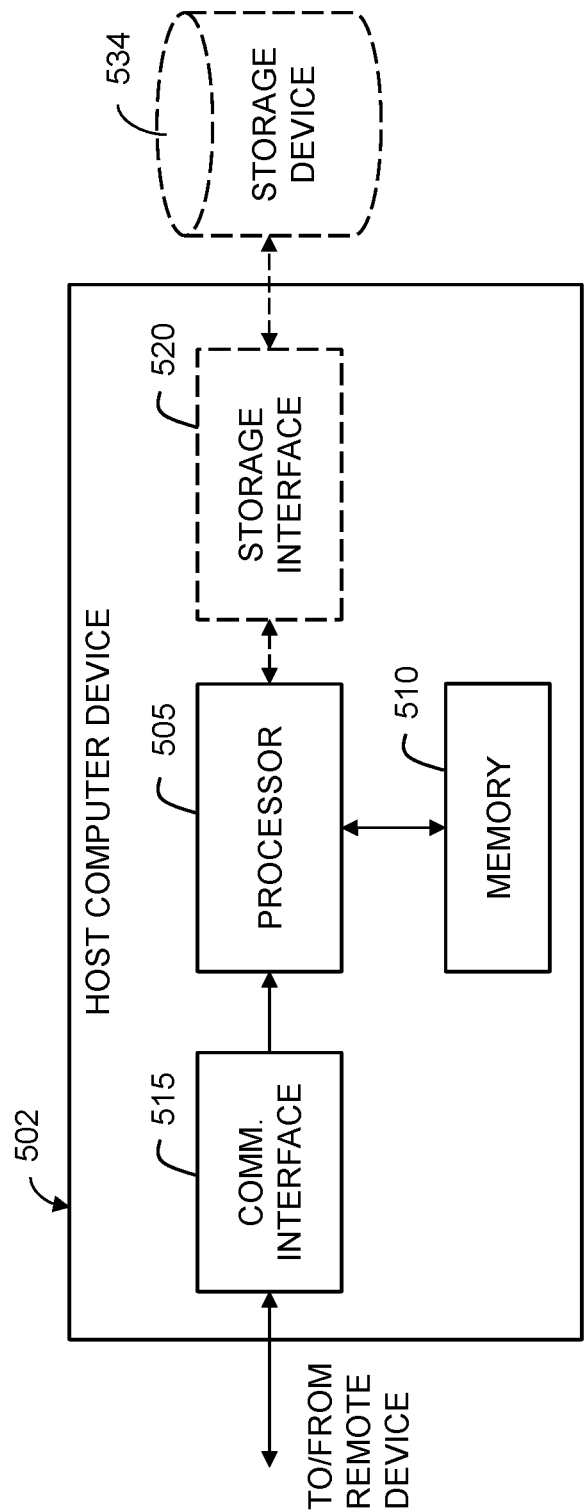

FIG. 5 depicts an exemplary configuration of a host computing device 502, such as WP computing device 108 (shown in FIG. 1), and in some embodiments, sponsoring authority 114 (shown in FIG. 1). Host computing device 502 may include a processor 505 for executing instructions. Instructions may be stored in a memory area 510, for example. Processor 505 may include one or more processing units (e.g., in a multi-core configuration).

Processor 505 may be operatively coupled to a communication interface 515 such that host computing device 502 may be capable of communicating with a remote device such as requesting user device 102 (shown in FIG. 1) or sponsoring authority 114. For example, communication interface 515 may receive requests from requesting user device 102 via network 118 (both shown in FIG. 1).

Processor 505 may also be operatively coupled to a storage device 534 (e.g., database 112, shown in FIG. 1). Storage device 534 may be any computer-operated hardware suitable for storing and/or retrieving data. In some embodiments, storage device 534 may be integrated in host computing device 502. For example, host computing device 502 may include one or more hard disk drives as storage device 534. In other embodiments, storage device 534 may be external to host computing device 502 and may be accessed by a plurality of host computing devices 502. For example, storage device 534 may include multiple storage units such as hard disks or solid state disks in a redundant array of inexpensive disks (RAID) configuration. Storage device 534 may include a storage area network (SAN) and/or a network attached storage (NAS) system.

In some embodiments, processor 505 may be operatively coupled to storage device 534 via a storage interface 520. Storage interface 520 may be any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Memory areas 410 (shown in FIG. 4) and 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
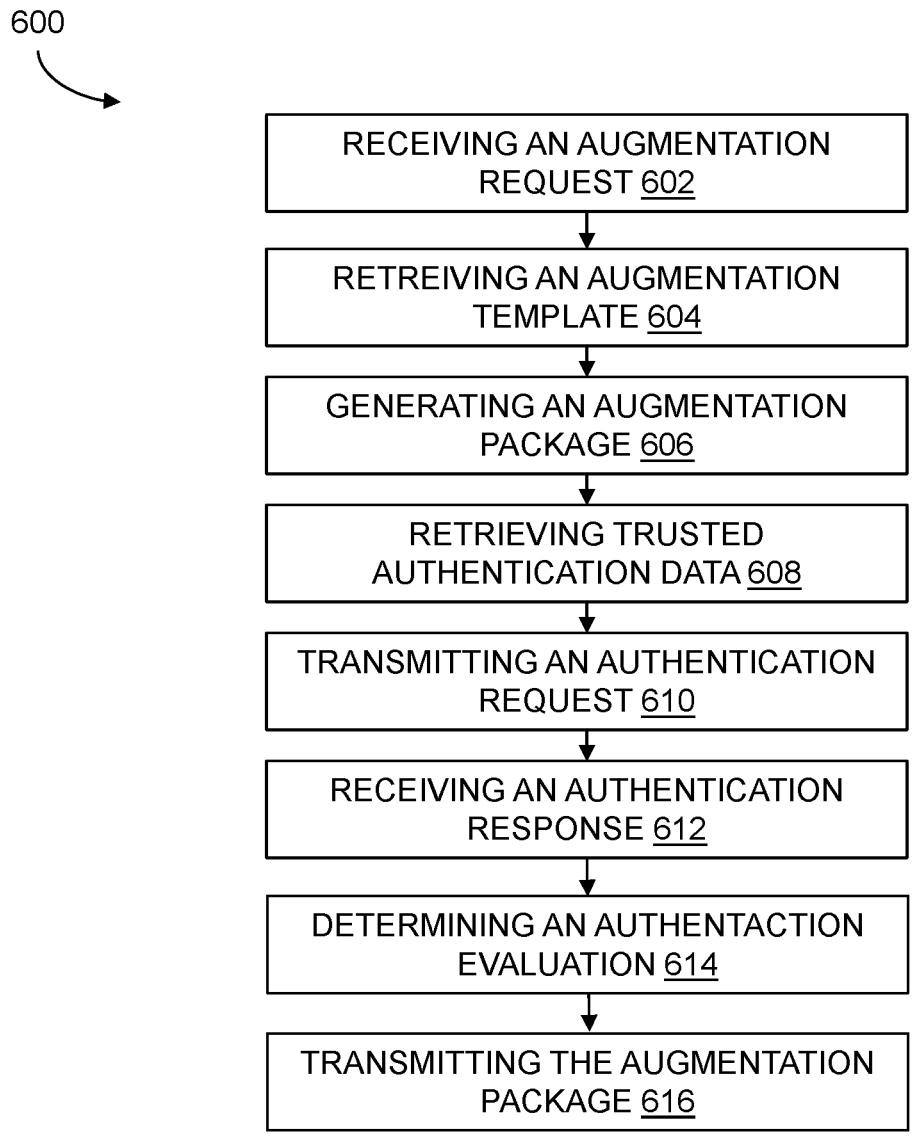

FIG. 6 is a flow diagram of an example method 600 for extending digital passport objects. Method 600 may be performed using a WP computing device 108 (shown in FIG. 1). In the example embodiment, method 600 is at least partially performed by a WP computing device 108. In other embodiments, method 600 includes additional, fewer, or alternative steps, including those described elsewhere herein.

To begin method 600, the WP computing device 108 receives 602 an augmentation request. The WP computing device retrieves 604 an augmentation template. The WP computing device generates 606 an augmentation package. The WP computing device retrieves 608 trusted authentication data. The WP computing device transmits 610 an authentication request. The WP computing device 612 receives an authentication response. The WP computing device determines 614 and authentication evaluation. The WP computing device transmits 616 the augmentation package.

Figure 7:
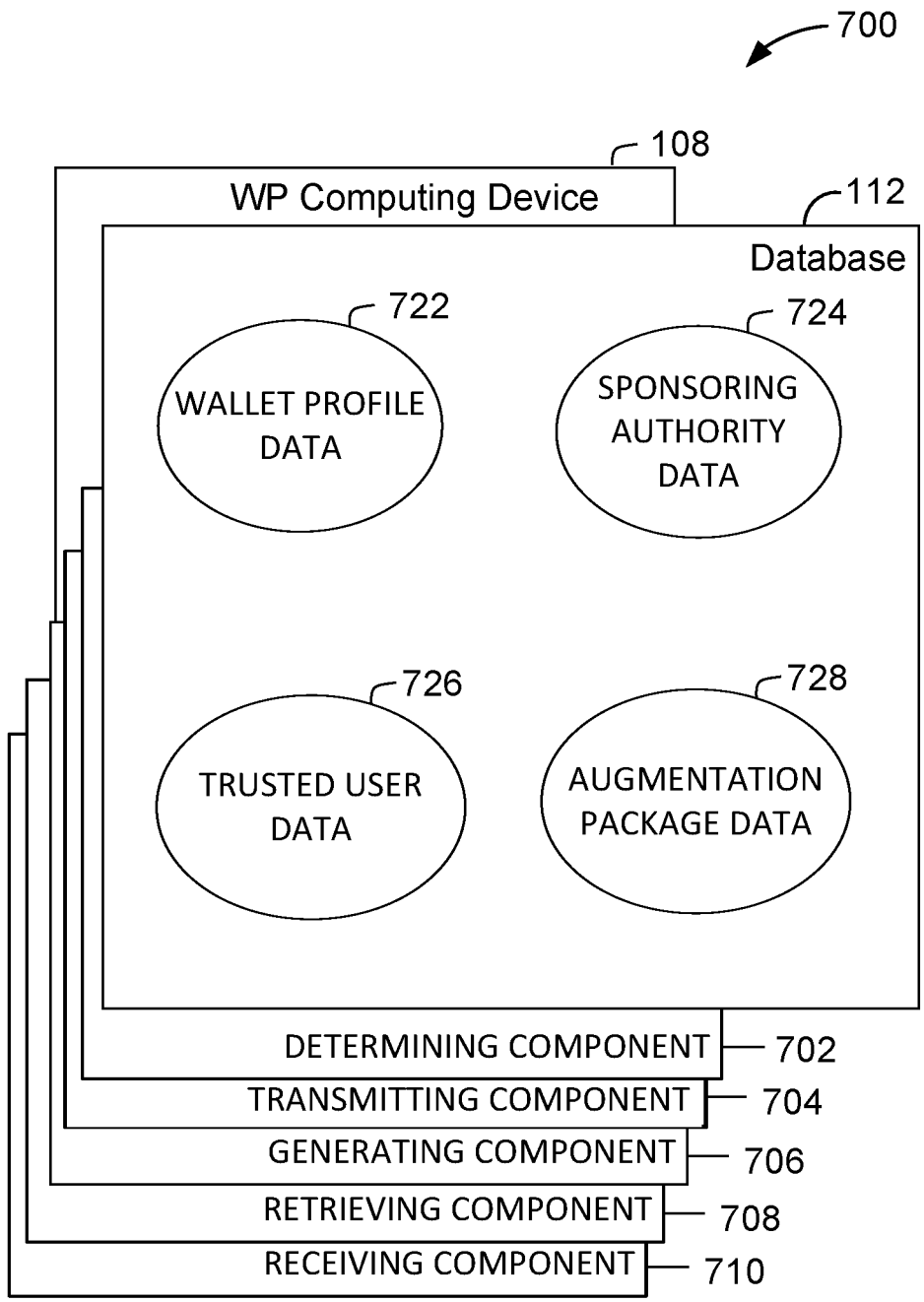

FIG. 7 is a diagram of components of one or more example computing devices that may be used in the method shown in FIG. 6. FIG. 7 further shows a configuration of a distributed database system 700 including at least database 112. Database system 700 is coupled to several separate components within WP computing device 108 (shown in FIG. 1), which perform specific tasks.

WP computing device 108 includes a receiving component 710 configured to receive an augmentation request associated with the digital passport object from a requesting user device, the augmentation request including a digital passport object associated with the digital passport object. WP computing device 108 further includes a retrieving component 708 configured retrieve an augmentation template, associated with a sponsoring authority, and trusted authentication data, associated with a digital wallet, based at least in part on the augmentation request. WP computing device 108 further includes a generating component 706 configured to generate an augmentation package associated with the digital passport object based at least in part on the augmentation template. WP computing device 108 further includes a transmitting component 704 configured to transmit an authentication response from the authenticating user device, wherein the authentication includes at least one authentication factor. WP computing device 108 further includes a determining component 702 configured to determine an authentication evaluation of the augmentation package associated with the digital passport object, based at least in part on the at least one authentication factor and the trusted authentication data, wherein the authentication evaluation is appended to the augmentation package. Transmitting component 704 is further configured to transmit the augmentation package to the sponsoring authority 114 (shown in FIG. 1), wherein the sponsoring authority 114 determines whether to extend the digital passport object based on the augmentation package In an exemplary embodiment database system 700 is divided into a plurality of sections, including but not limited to, a wallet profile data section 722, a sponsoring authority data section 724, a trusted user data section 726, and an augmentation package data section 728. In one embodiment, these sections are stored on database 112. In another embodiment, these data sections are separated between database 112, sponsoring authority 114, and requesting user device 102, wherein the data sections are interconnected through WP computing device 108 to update and retrieve information as required.

While the invention has been described in terms of various specific embodiments, those skilled in the art will recognize that the invention can be practiced with modification within the spirit and scope of the claims.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are paymentable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is retrieving an augmentation template, generating an augmentation package associated with the digital passport object, transmitting an authentication request, receiving an authentication response, determining an authentication evaluation, and transmitting the updated augmentation package. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A host computing device for extending a digital passport object comprising one or more processors in communication with one or more memory devices, the host computing device configured to:
   manage a digital wallet application installed on a user device, wherein the digital wallet application is configured to (i) store payment card information for at least one payment card digitally on the user device, (ii) perform payment transactions using the payment card information over a payment processing network, and (iii) store the digital passport object, wherein the digital passport object is an electronically stored representation of an identity document issued by a governmental sponsoring authority for international travel;
   query the payment processing network for a payment card transaction performed by the user device using the digital wallet application, wherein the payment card transaction includes an identifier of a geographic region and a travel date on which travel to the geographic region is planned;
   compare the planned travel date returned from the query of the payment processing network to an expiration date included in the digital passport object, wherein the expiration date is a date beyond which the digital passport object is no longer deemed valid for international travel by the governmental sponsoring authority;
   transmit, prior to the planned travel date, an alert to the user device, wherein the alert includes the planned travel date, the geographic region identifier, and the expiration date;
   receive an augmentation request associated with the digital passport object from the digital wallet application executing on the user device, the augmentation request including a digital passport object identifier associated with the digital passport object;
   retrieve (i) an augmentation template associated with the governmental sponsoring authority, and (ii) trusted authentication data associated with the digital wallet application, based at least in part on the augmentation request;
   query the digital wallet application for user data to generate an augmentation package associated with the digital passport object, wherein the augmentation package is generated based at least in part on the augmentation template;
   identify missing user data based at least in part on the augmentation template to generate a user data request based at least in part on the missing user data;
   transmit the user data request to the user device;
   receive a user data response including the requested missing user data;
   apply the requested missing user data to the augmentation package;
   transmit an authentication request to an authenticating user device, wherein the authentication request is based on the trusted authentication data;
   receive an authentication response from the authenticating user device, wherein the authentication response includes at least one authentication factor;
   determine an authentication evaluation of the augmentation package associated with the digital passport object, based at least in part on the at least one authentication factor and the trusted authentication data, wherein the authentication evaluation is appended to the augmentation package to create an updated augmentation package;
   transmit the updated augmentation package to the governmental sponsoring authority, wherein the governmental sponsoring authority determines whether to extend the digital passport object based on the updated augmentation package;
   receive, from the governmental sponsoring authority, an augmentation response indicating an extension of the digital passport object; and
   in response to the augmentation response, transmit an extended digital passport object to the digital wallet application on the user device.

2. The host computing device of claim 1, wherein the host computing device is further configured to:
   encode the extended digital passport object into at least one machine-readable representation.

3. The host computing device of claim 1, wherein the extended digital passport object includes an updated expiration identifier.

4. The host computing device of claim 1, wherein the extended digital passport object includes a passport endorsement.

5. The host computing device of claim 1, wherein the host computing device is further configured to:
   receive a location identifier from the user device;
   determine the location identifier is associated with a transport hub having a region identifier;
   generate a machine readable encoding of the digital passport object based on the region identifier; and
   transmit the machine readable encoding to the user device.

6. A computer-implemented method of extending a digital passport object stored in a digital wallet application, the method implemented using a wallet provider (WP) computing device including at least one processor in communication with a memory, the method comprising:
   managing the digital wallet application installed on a user device, wherein the digital wallet application is configured to (i) store payment card information for at least one payment card digitally on the user device, (ii) perform payment transactions using the payment card information over a payment processing network, and (iii) store the digital passport object, wherein the digital passport object is an electronically stored representation of an identity document issued by a governmental sponsoring authority for international travel;

querying the payment processing network for a payment card transaction performed by the user device using the digital wallet application, wherein the payment card transaction includes an identifier of a geographic region and a travel date on which travel to the geographic region is planned;

comparing the planned travel date returned from the query of the payment processing network to an expiration date included in the digital passport object, wherein the expiration date is a date beyond which the digital passport object is no longer deemed valid for international travel by the governmental sponsoring authority;

transmitting, prior to the planned travel date, an alert to the user device, wherein the alert includes the planned travel date, the geographic region identifier, and the expiration date;

receiving an augmentation request associated with the digital passport object from the digital wallet application executing on the user device, the augmentation request including a digital passport object identifier associated with the digital passport object;

retrieving (i) an augmentation template associated with the governmental sponsoring authority, and (ii) trusted authentication data associated with the digital wallet application based at least in part on the augmentation request;

querying the digital wallet application for user data to generate an augmentation package associated with the digital passport object, wherein the augmentation package is generated based at least in part on the augmentation template;

identifying missing user data based at least in part on the augmentation template to generate a user data request based at least in part on the missing user data;

transmitting the user data request to the user device;

receiving a user data response including the requested missing user data;

applying the requested missing user data to the augmentation package;

transmitting an authentication request to an authenticating user device, wherein the authentication request is based on the trusted authentication data;

receiving an authentication response from the authenticating user device, wherein the authentication response includes at least one authentication factor;

determining an authentication evaluation of the augmentation package associated with the digital passport object, based at least in part on the at least one authentication factor and the trusted authentication data, wherein the authentication evaluation is appended to the augmentation package;

transmitting the updated augmentation package to the governmental sponsoring authority, wherein the governmental sponsoring authority determines whether to extend the digital passport object based on the augmentation package;

receiving, from the governmental sponsoring authority, an augmentation response indicating an extension of the digital passport object; and in response to the augmentation response, transmitting an extended digital passport object to the digital wallet application on the user device.

7. The method of claim 6 further comprising:
encoding the extended digital passport object into at least one machine-readable representation.

8. The method of claim 6 wherein the extended digital passport object includes an updated expiration identifier.

9. The method of claim 7 wherein the extended digital passport object includes a passport endorsement.

10. The method of claim 6 further comprising:
receiving a location identifier from the user device;
determining the location identifier is associated with a transport hub having a region identifier;
generating a machine readable encoding of the digital passport object based on the region identifier; and
transmitting the machine readable encoding to the user device.

11. A non-transitory computer-readable storage medium having computer-executable instructions embodied thereon, wherein when executed by a WP computing device that includes at least one processor in communication with a memory, the computer-executable instructions cause the WP computing device to:

manage a digital wallet application installed on a user device, wherein the digital wallet application is configured to (i) store payment card information for at least one payment card digitally on the user device, (ii) perform payment transactions using the payment card information over a payment processing network, and (iii) store a digital passport object, wherein the digital passport object is an electronically stored representation of an identity document issued by a governmental sponsoring authority for international travel;

query the payment processing network for a payment card transaction performed by the user device using the digital wallet application, wherein the payment card transaction includes an identifier of a geographic region and a travel date on which travel to the geographic region is planned;

compare the planned travel date returned from the query of the payment processing network to an expiration date included in the digital passport object, wherein the expiration date is a date beyond which the digital passport object is no longer deemed valid for international travel by the governmental sponsoring authority;

transmit, prior to the planned travel date, an alert to the user device, wherein the alert includes the planned travel date, the geographic region identifier, and the expiration date;

receive an augmentation request associated with the digital passport object from the digital wallet application executing on the user device, the augmentation request including a digital passport object identifier associated with the digital passport object;

retrieve (i) an augmentation template associated with the governmental sponsoring authority, and (ii) trusted authentication data associated with the digital wallet application, based at least in part on the augmentation request;

query the digital wallet application for user data to generate an augmentation package associated with the digital passport object, wherein the augmentation package is generated based at least in part on the augmentation template;

identify missing user data based at least in part on the augmentation template to generate a user data request based at least in part on the missing user data;

transmit the user data request to the user device;

receive a user data response including the requested missing user data;

apply the requested missing user data to the augmentation package;

transmit an authentication request to an authenticating user device, wherein the authentication request is based on the trusted authentication data;

receive an authentication response from the authenticating user device, wherein the authentication response includes at least one authentication factor;

determine an authentication evaluation of the augmentation package associated with the digital passport object, based at least in part on the at least one authentication factor and the trusted authentication data, wherein the authentication evaluation is appended to the augmentation package to create an updated augmentation package;

transmit the updated augmentation package to the governmental sponsoring authority, wherein the governmental sponsoring authority determines whether to extend the digital passport object based on the augmentation package receive, from the governmental sponsoring authority, an augmentation response indicating an extension of the digital passport object; and in response to the augmentation response, transmit an extended digital passport object to the digital wallet application on the user device.

12. The non-transitory computer-readable storage medium of claim 11, wherein the computer-executable instructions further cause the WP computing device to:

encode the extended digital passport object into at least one machine-readable representation.

13. The non-transitory computer-readable storage medium of claim 11, wherein the extended digital passport object includes an updated expiration identifier.

14. The non-transitory computer-readable storage medium of claim 11, wherein the extended digital passport object includes a passport endorsement.

15. A computer-implemented method of providing a secondary digital passport object to a destination device, the method implemented using a wallet provider (WP) computing device including at least one processor in communication with a memory, the method comprising:

managing a digital wallet application installed on a source device, wherein the digital wallet application is configured to (i) store payment card information for at least one payment card digitally on the source device, (ii) perform payment transactions using the payment card information over a payment processing network, and (iii) store a primary digital passport object, wherein the primary digital passport object is an electronically stored representation of an identity document issued by a governmental sponsoring authority for international travel;

querying the payment processing network for a payment card transaction performed by the source device using the digital wallet application, wherein the payment card transaction includes an identifier of a geographic region and a travel date on which travel to the geographic region is planned;

comparing the planned travel date returned from the query of the payment processing network to a first expiration date included in the primary digital passport object, wherein the first expiration date is a date beyond which the primary digital passport object is no longer deemed valid for international travel by the governmental sponsoring authority;

transmitting, prior to the planned travel date, an alert to the source device, wherein the alert includes the planned travel date, the geographic region identifier, and the first expiration date;

receiving a transmission request from the digital wallet application executing on the source device, the transmission request including a digital passport object identifier associated with the primary digital passport object, and a destination device identifier;

retrieve an augmentation template associated with the governmental sponsoring authority based at least in part on the transmission request;

query the digital wallet application for user data to generate an augmentation package associated with the primary digital passport object, wherein the augmentation package is generated based at least in part on the augmentation template;

identify missing user data based at least in part on the augmentation template to generate a user data request based at least in part on the missing user data;

transmit the user data request to the source device;

receive a user data response including the requested missing user data;

apply the requested missing user data to the augmentation package;

generating the secondary digital passport object based at least in part on the digital passport object identifier, the secondary digital passport object having a second expiration date, wherein the second expiration date is a date beyond which the secondary digital passport object is no longer deemed valid for international travel by the governmental sponsoring authority;

generating an authentication challenge based at least in part on the transmission request;

transmitting to the destination device the authentication challenge;

receiving an authentication response from the destination device; and transmitting the secondary digital passport object to the destination device, when the authentication response indicates the transmission request has been authenticated.

16. The method of claim 15 further comprising:

identifying at least one sponsoring authority associated with the secondary digital passport object; and generating and then transmitting an additional alert to an associated sponsoring authority, based at least in part on the secondary digital passport object.

17. The host computing device of claim 1, wherein the authentication response includes biometric data captured by the authenticating user device.

18. The method of claim 6, wherein receiving the authentication response further comprises receiving biometric data captured by the authenticating user device.

* * * * *